United States Patent
Kapron et al.

(10) Patent No.: US 11,429,549 B2
(45) Date of Patent: Aug. 30, 2022

(54) INPUT/OUTPUT PORT CONFIGURATIONS USING MULTIPLEXERS

(71) Applicant: HEWLETT-PACKARD DEVELOPMENT COMPANY, L.P., Houston, TX (US)

(72) Inventors: Neill Thomas Kapron, Ft. Collins, CO (US); Christopher Ritchie Tabarez, Ft. Collins, CO (US); Glen Douglas Dower, Ft. Collins, CO (US); Nicolas James Jurich, Ft. Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 1057 days.

(21) Appl. No.: 16/076,727

(22) PCT Filed: Jul. 20, 2017

(86) PCT No.: PCT/US2017/043067
§ 371 (c)(1),
(2) Date: Aug. 9, 2018

(87) PCT Pub. No.: WO2019/017952
PCT Pub. Date: Jan. 24, 2019

(65) Prior Publication Data
US 2021/0182225 A1   Jun. 17, 2021

(51) Int. Cl.
*G06F 13/364* (2006.01)
*G06F 3/023* (2006.01)
*G06F 3/038* (2013.01)

(52) U.S. Cl.
CPC ............ *G06F 13/364* (2013.01); *G06F 3/023* (2013.01); *G06F 3/038* (2013.01)

(58) Field of Classification Search
CPC ......... G06F 13/364; G06F 3/023; G06F 3/038
See application file for complete search history.

(56) References Cited

U.S. PATENT DOCUMENTS 3,826,872 A * 7/1974 MacGregor ............... H04L 5/00
                                                           370/359
8,270,295 B2   9/2012 Kendall et al.
(Continued)

FOREIGN PATENT DOCUMENTS

WO       2016166539 A1    10/2016

OTHER PUBLICATIONS

McLean et al., "Reducing Energy Use : Automatic Selection of The Appropriate Communications Channel", IEEE, Abstract, Retrieved from internet—https://ieeexplore.ieee.org/document/6196952, 2012, 3 Pages.

*Primary Examiner* — Ariel A Balaoing
(74) *Attorney, Agent, or Firm* — Hanley Flight & Zimmerman LLC (57) ABSTRACT

Input/Output port configurations using multiplexers are described herein. An example computing system includes a multiplexer having a first input, a second input, and an output. The computing system also includes a first channel connecting the first input to a first host controller, the first host controller to transfer data at a first speed, and a second channel connecting the second input to a second host controller, the second host controller to transfer data at a second speed higher than the first speed. The example computing system further includes a third channel connecting the output to a port, the port to receive a connector of an electronic device, and a line selector to, based on a type of the electronic device connected to the port, configure the multiplexer to electrically couple the output to the first input or the second input.

15 Claims, 5 Drawing Sheets

(56) References Cited

U.S. PATENT DOCUMENTS

| | | |
|---|---|---|
| 8,654,634 B2 | 2/2014 | Kendall et al. |
| 9,088,935 B2 | 7/2015 | Park |
| 2004/0181328 A1* | 9/2004 | Davidson .............. B60R 13/105 701/1 |
| 2006/0288150 A1 | 12/2006 | Jang et al. |
| 2007/0264983 A1* | 11/2007 | Chen ....................... G06F 3/038 455/414.1 |
| 2009/0049213 A1* | 2/2009 | Chen ..................... G06F 13/385 710/104 |
| 2010/0235655 A1* | 9/2010 | Tauscher ............... G06F 13/387 713/300 |
| 2016/0306763 A1* | 10/2016 | Geva ................... G06F 13/4282 |
| 2016/0378704 A1 | 12/2016 | Adamson et al. |
| 2017/0109248 A1 | 4/2017 | Yang et al. |
| 2017/0249269 A1* | 8/2017 | Bodley ................... G06F 13/42 |
| 2019/0391944 A1* | 12/2019 | Seiler ............... G06K 19/07732 |

\* cited by examiner

INPUT/OUTPUT PORT CONFIGURATIONS USING MULTIPLEXERS

BACKGROUND

In recent years, different types of connectors, such as Universal Serial Bus (USB) Type A, B, and1 C connectors, have become increasingly used to connect a host system, such as a computer, and an electronic device, such as a mouse, a keyboard, a printer, etc. Further, USB and other data transfer schemes have become capable of faster speeds.

The figures are not to scale. Wherever possible, the same reference numbers will be used throughout the drawing(s) and accompanying written description to refer to the same or like parts. While the drawings illustrate examples of computing systems and associated methods and apparatus, other examples may be employed to implement the examples disclosed herein.

DETAILED DESCRIPTION

Modern computing systems, such as those in desktop or laptop computers, usually have a limited number of high-speed input/output (I/O) lanes on the motherboard or associated I/O chipset. In particular, the motherboard and/or I/O chipset may include one host controllers or multiple host controllers that are configured to implement specific types of data transfer standards or protocols, such as USB Implementers Forum (USB-IF), Peripheral Component Interconnect. Express (PCIe) specification, DisplayPort specification, Video Electronics Standard Association (VESA) standard. Thunderbolt, etc. Different versions of these standards have been released throughout the years, each version having faster data transfer rates than previous versions. For instance, USB 1.0 has a data transfer rate of about 1.5 Mbit/s; USB 2.0 has a data transfer rate of about 480 Mbit/S; USB 3.1 (Gen 1) has a data transfer rate of about 5 Gbitis; and USB 3.1 (Gen 2) has a data transfer rate of about 10 Gbit/s. As another example, Thunderbolt v1 has two channels, each with a data transfer rate of about 10 Gbit/s; Thunderbolt v2 has a data transfer rate of about 20 Gbit's: and Thunderbolt v3 has a data transfer rate of about 40 Gbit/s.

The lanes or channels leading from the host controller(s) end at specific types of connectors (e.g., a plug) such as, for example, USB Types A, B, or C connectors, High-Definition Multimedia Interface (HDMI) connectors, DisplayPort connectors, Lightning connectors, etc. Different physical ports and plug connectors may be used for different ones of the data transfer standards or protocols. In some instances, the same type of connector may be used with different types of data transfer protocols. For example, USB Type A connectors can be used for USB 1.0 and USB 3.1 (Gen 1) protocols.

Designers of current computing systems have to make a decision on where to place the physical ports at which the higher speed and lower speed lanes terminate. For instance, if a motherboard (and/or associated chipset) offers one high-speed lane (e.g., USB 3.1 (Gen 2)) and one low-speed lane (e.g., USB 2.0), the designer has to decide where to offer the port for the high-speed lane, such as on the front chassis of the computer, on the rear chassis of the computer, etc. It is often difficult to meet the specific needs of all users, as some users may prefer the high-speed ports on the rear of the computer to hide cables, while others users may prefer the high-speed ports on the front of the computer for ease of accessibility. Also, computing systems generally have many lower speed lanes and only a few (e.g., one or two) high-speed lanes. Therefore, while the ports of the lower speed lanes can be distributed on the front and back of a computer, for example, it is harder to meet the demands of the user with only one or two ports for the high-speed lanes. Thus, end users are often limited by the static implementation of the port locations chosen by the designer and by the number of available high-speed ports.

Further, because the ports of the high-speed and low-speed lanes may be the same type of port (e.g., USB Type A is capable of supporting USB 1.0, 2.0, 3.1 (Gen 1) and (Gen 2)), a user may inadvertently connect an electronic device to the wrong port. For example, a computer may include a first USB Type A port that is configured to operate USB 3.1 (Gen 2) protocol and a second USB Type A port that is configured to operate at a lower speed protocol, such as USB 2.0. If the user's electronic device is plugged into the lower speed port (the USB 2.0 Type A port), the operation of the device is limited by the speed of the lower speed protocol. Thus, unless the ports are clearly labeled and the user connects the electronic device to the correct port, the electronic device may be inadvertently plugged into the wrong port.

Disclosed herein are example methods, apparatus, systems, and articles of manufacture that enable multiple end-point port locations to be connected to various high-speed or low-speed channels of a motherboard and/or I/O chipset of a computing system. As a result, any port of the computing system can be used as a high-speed port and, thus, a user is not limited by the locations of the various ports of the computing system.

Disclosed herein are example multiplexer systems that include a multiplexer and a line selector that configures the multiplexer to connect certain ones of the ports to certain ones of the high-speed or low-speed channels. A multiplexer (commonly shortened as MUX or MPX) is a type of data selector or switch. A MUX may be designed in various manners to perform different functions. For example, a MUX may include a plurality of data inputs and one data output, and the MUX may select between one of the data inputs to connect to the data output. As another example, a MUX may include one data input and a plurality of data outputs, and the MUX may select which one of the data outputs to connect to the data input. As another example, a MUX may include multiple inputs and multiple outputs, and the MUX may select which ones of the inputs to connect to which ones of the outputs. In particular, the example MUX operates between different MUX configurations that connect different ones of the inputs and the outputs. The MUX can be reconfigured via a switch and/or logic signal (e.g., a voltage signal) representing a logic value. For example, a logic value of 0 may connect a first input to a first output, and a logic value of 1 may connect the first input to a second output. An example MUX can be constructed of a system of transistors (e.g., metal-oxide-semiconductor field-effect transistors (MOSFETs)) and/or relays or a digital circuit made of high-speed logic gates and used to switch digital or binary data.

In some examples disclosed herein, the example MUX includes a plurality of inputs and a plurality of outputs. The inputs of the MUX are connected to the high-speed and low-speed channels of the computing system and the outputs are connected to the various ports. The MUX is configurable to connect any of the inputs to the outputs and, thus, can connect any one of the ports to the high-speed channel. The line selector generates a logic signal (e.g., a control signal) that configures the MUX based on the desired connection. In some examples, the line selector is implemented as a physical switch (e.g., a jumper switch) that may be activated by a user. For example, the switch may be disposed on a housing of the computer and/or otherwise accessible by a user. The user may manually actuate the switch between two or more positions (depending on the number of MUX configurations) to change the configuration of the MUX.

In another example, the line selector may be implemented as a logic circuit or a processor that determines how to configure the MUX. In some examples, the line selector determines how to configure the MUX on a first-come first-serve basis. For example, assume a computing system has one high-speed channel and one low-speed channel. If a first high-speed device is plugged into one of the end ports, and the high-speed channel is free, the selector configures the MUX to connect the first end port to the high-speed channel. Then, if a second high-speed device is plugged into a second one of the end ports, the switch determines that a high-speed device is already connected to the high-speed channel, so the second high-speed device is connected instead to the lower speed channel.

Additionally or alternatively, a rule or parameter may be established by a user. For example, a user may manually configure which devices should be assigned to which channels and/or which devices may have priority over other devices. For example, if a higher priority device and a lower priority device are connected to the computing system at (e.g., simultaneously) or about the same time, the line selector may configure the MUX to connect the higher priority device to the high-speed channel and connect the lower priority device to one of the low-speed channels. As another example, the user may establish a rule that certain types of devices, although capable of higher speeds, should be connected to the lower speed channel(s) to ensure other types of devices have access to the higher speed channel(s), In general, if a higher speed device is plugged into a lower speed channel, the device can only transfer data according to the lower speed protocol. Similarly, if a lower speed device is plugged into a higher speed channel, the device can only transfer data according to the lower speed protocol of the device.

Further, unlike other solutions like hubs that reduce bandwidth and increase latency (due to the way the hub splits one signal lane into multiple ports), the example multiplexer provides full bandwidth to the selected port and, thus, introduces minimal (if any) latency. Also, while hubs rely on the base transmission and control technologies of the high-speed protocol, which may be released after a new protocol is released, the example multiplexers operate independent of the type of data transfer protocol implemented by the host controller. Thus, the example multiplexer can be used with any future, unknown protocols without the time-to-market delays seen with hubs. Also, the examples disclosed herein can be implemented without the need for dongles and adapters as seen in known systems. In other words, the examples disclosed herein enable different types of ports to be high-speed capable. Thus, the need for adapters and dongles to transform the electronic device connector into the proper connector is eliminated or reduced.

Figure 1:
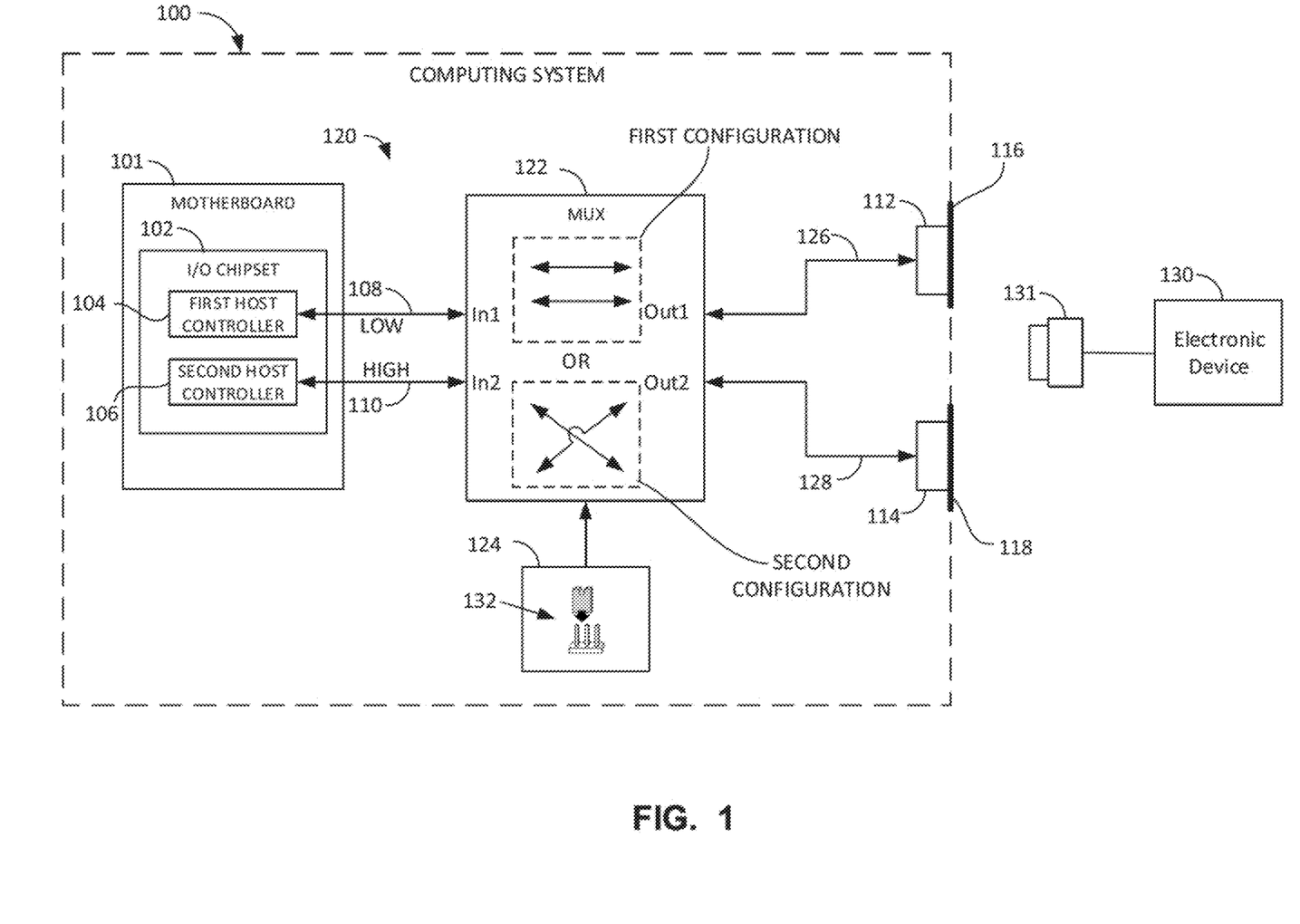
FIG. 1 illustrates an example computing system having an example multiplexer system with an example jumper switch constructed in accordance with the teachings of this disclosure.

FIG. 1 is a schematic illustration of an example computing system 100 in which the examples disclosed herein may be implemented. In the examples disclosed herein, the example computing system 100 is described as being a computer. However, in other examples, the example computing system 100 may be implemented as any other type of computing system, such as a laptop computer, a tablet, a smart phone, a printer, a server, etc.

In the illustrated example, the computing system 100 includes a motherboard 101 with an input/output (I/O) chipset 102 having a first host controller 104 and a second host controller 106. In some examples, the I/O chipset 102 is integrated into or part of the motherboard 101 (e.g., embedded in the Southbridge). In other examples, the I/O chipset 102 may be a discrete or separate chip electrically coupled to the motherboard 101. In still other examples, the I/O chipset 102 may be a separate peripheral card (e.g., a PCI USB adapter) electrically coupled to the motherboard 101. Further, while in the illustrated example the first and second host controllers 104, 106 are part of the same I/O chipset 102, in other examples, the first and second host controllers 104, 106 may be implemented on separate I/O chipsets.

In the illustrated example, the first and second host controllers 104, 106 include hardware and/or software for transferring data according to a specific data transfer standard or protocol such as, for example, USB 1.0, USB 2.0, USB 3.1 (Gen 1), USB 3.1 (Gen 2), Thunderbolt. DisplayPort, etc. In this example, the first host controller 104 implements a data transfer protocol that transfers or communicates data at a first speed and the second host controller 106 implements a data transfer protocol that transfers or communicates data at a second speed higher than the first speed of the first host controller 104. In the illustrated example, the first host controller 104 includes a first channel 108 (e.g., a lane) and the second host controller 106 includes a second channel 110. Therefore, the first host controller 104 and the first channel 108 may be considered, for example, a low-speed I/O lane or channel and the second host controller and the second channel 110 may be considered, for example, a high-speed I/O lane or channel. For example, the first channel 108 may be a USB 2.0 (480 Mbit/S) channel and the second channel 110 may be USB 3.1 (Gen 1) (5 Gbit/s) channel. In other examples, the first and second channels 108, 110 may be other types of channels for implementing other versions of USB and/or other types of data transfer standards or protocols, such as PCIe, DisplayPort, Thunderbolt, etc. In the illustrated example, the first channel 108 is labeled as "LOW" and the second channel 110 is labeled as "HIGH" to illustrate the relative speeds. However, it is understood that both of the first and second channels 108, 110 may implement relatively high data transfer speeds. For example, the first channel 108 may be a USB 3.1 (Gen 1) (5 Gbit/s) channel and the second channel 110 may be USB 3.1 (Gen 2) (10 Gbit/s) channel, both of which are higher than USB 2.0, for example. Also, in other examples, the computing system 100 may include more host controllers implementing other data transfer standards or protocols. The host controllers may be part of the same I/O chipset 102 or a different chipset electrically coupled to the motherboard 101.

To connect electronic devices to the motherboard 101, the example computing system 100 may include I/O ports (sometimes referred to as endpoints, endpoint ports, or endpoint location ports). In the illustrated example, the computing system 100 includes a first port 112 and a second port 114. Without a MUX, the first channel 108 (the low-speed channels) ends or terminates at one of the first or second ports 112, 114 and the second channel 110 (the high-speed channel) ends or terminates at the other of the first or second ports 112, 114. Thus, without the MUX, the computing system is limited by the locations of these ports and the types of ports. In the illustrated example, the first port 112 is coupled to a first panel 116 and the second port 114 is coupled to a second panel 118. The first and second panels 116, 118 represents walls or surfaces of a chassis (e.g., a covering, a housing, etc.) of the computing system 100. The first and second panels 116, 118 may be part of a same side or section of the chassis and, thus, the first and second ports 112, 114 may be disposed next to each other (e.g., on a front of a computer, or a rear of a computer, etc.). However, in other examples, the first panel 116 and the second panel 118 may be on different sides or sections of the chassis. For example, the first panel 116 may represent a first side (e.g., a front side) of the chassis of the computing system 100 and the second panel 118 may represent a second side (e.g., a rear side) of the chassis of the computing system 100 different than the first side. In other examples, the first panel 116 and/or the second panel 118 may be disposed in other locations, such as an internal panel or mount in the computer.

The first and second ports 112, 114 may be any type of port, such as a USB Type A port, a USB Type B port, a USB Type C port, a DisplayPort port, a Thunderbolt Port, etc. In some examples, the first and second ports 112, 114 are a same type of port, such as a USB Type C port. In other examples, the first and second ports 112, 114 are different types of ports. For example, the first port 112 may be a USB Type A port and the second port 114 may be a USB Type C port.

To enable an electronic device to be connected into either the first or second port 112, 114 and still be connected to the appropriate channel, the computing system 100 includes an example multiplexer system 120. In the illustrated example, the example multiplexer system 120 includes a multiplexer (MUX) 122 and a line selector 124. The MUX 122 is selectively configurable to electrically couple the first and second ports 112, 114 to either of the first or second channels 108, 110. In the illustrated example, the example MUX 122 includes two inputs: a first input In1 and a second input In2, and two outputs: a first output Out1 and a second output Out2. The inputs Int In2 and the outputs Out1, Out2 are pins or ports on the MUX 122. While these pins or ports are referred to herein as inputs and outputs, it is understood that data signals may be transferred in either direction. Thus, an input could be considered an output, and vice-versa. Additionally, while in the illustrated example the MUX 122 includes two inputs and two outputs, in other examples, the MUX 122 may include more inputs and/or more outputs.

In the illustrated example, the first channel 108 of the first host controller 104 (the low-speed channel) is electrically coupled to the first input In1 of the MUX 122 and the second channel 110 of the second host controller 106 (the high-speed channel) is electrically coupled to the second input In2. In the illustrated example, a third channel 126 electrically couples the first output Out1 to the first port 112 and a fourth channel 128 electrically couples the second output Out2 to the second port 114. The MUX 122 is operable between two configurations: a first configuration (shown in the top dashed box) where the first input In1 is electrically coupled to the first output Out1 and the second input In1 is electrically coupled to the second output Out2, and a second configuration (shown in the bottom dashed box) where the first input In1 is electrically coupled to the second output Out2 and the second input In2 is electrically coupled to the first output Out1. In other words, in the first configuration, the first port 112 is electrically coupled to the first channel 108 (the low-speed channel) and the second port 114 is electrically coupled to the second channel 110 (the high-speed channel), and in the second configuration, the first port 112 is electrically coupled to the second channel 110 and the second port 114 is electrically coupled to the first channel 108. Thus, the MUX 122 can connect either of the first or second ports 112, 114 to the first or second channels 108, 110.

The example multiplexer system 120 enables either port 112, 114 to be used as a high-speed or a low-speed channel. In other words, both the first and second ports 112, 114 are high-speed capable. For example, assume a user wants to plug an electronic device 130, which is a high-speed device, into the computing system 100. In the illustrated example, the electronic device 130 has a connector 131 that may be plugged into at least one of the first or second ports 112, 114, For example, the connector 131 may be a USB Type C connector, and the first and second ports 112, 114 may be USB Type C ports. The electronic device 130 may be any type of electronic device, such as a printer, a monitor, a hard drive, etc. If the electronic device 130 is plugged into the first port 112, the MUX 122 can be configured to couple the third channel 126 to the second channel 110 (i.e., the second configuration). Thus, the electronic device 130 can have high-speed access. As another example, if the user plugs the electronic device 130 into the second port 114, the MUX 122 can be configured to couple the fourth channel 128 to the second channel 110 (i.e., the first configuration). If a second electronic device is connected to the other of the first or second port 112, 114, the second electronic device is connected to the first channel 108. Thus, both of the first and second ports 112, 114 are high-speed capable. As such, a user is not limited by the location of the first and second ports 112, 114.

In the illustrated example, the MUX 122 is configured based on a logic signal (e.g., a voltage signal) from the line selector 124. In other words, the line selector 124 determines in which configuration the MUX 122 is to operate. For example, the line selector 124 may apply a first signal to the MUX 122 to cause the MUX 122 to operate in the first configuration or a second signal to cause the MUX 122 to operate in the second configuration. The first and second signals representative of a logic value may be, for example, a high and a low voltage signal, a zero voltage and a positive voltage signal, and/or any other combination of signals and/or absence of signals that can represent the two configurations.

In the illustrated example of FIG. 1, the line selector 124 is implemented as a physical switch such as a jumper switch 132. The jumper switch 132 is operable between two states or positions. The jumper switch 132 may apply the first signal when the jumper switch 132 is in a first position and apply the second signal when the jumper switch 132 is in a second position. For example, in the first position, zero voltage signal (e.g., a first logic value) may be provided to the MUX 122, and the MUX 122 may be in the first configuration. To switch the MUX 122 to the second configuration, the jumper switch 132 is switched to the second position, which applies a positive voltage signal (e.g., +1 volt, a second logic value) to the MUX 122 and causes the MUX 122 to switch to the second configuration. A user may manually operate (e.g., by plugging and/or unplugging) the jumper switch 132 based on the desired connections to be made. Therefore, depending on whether the user wants the first or second ports 112, 114 to be high speed, the user can rearrange the jumper switch 132. As such, if the first and second ports 112, 114 are disposed on the front and rear of a computer, for example, a user can have high-speed access using either port.

In some examples, the example jumper switch 132 may be integrated into the motherboard 101 of the computing system 100. In other examples, the jumper switch 132 may be mounted on the chassis of the computer system 100 near the first and second ports 112, 114, and/or in another location accessible by a user. Also, while in the illustrated example the line selector 124 is implemented as the jumper switch 132, in other examples, other types of physical switches (e.g., a toggle switch, a rocker switch, etc.) may be implemented to switch the MUX 122 between the first configuration and the second configuration. In other examples, instead of a physical switch, the line selector 124 may be implemented in the Basic Input/Output System (BIOS) of the computing system 100. In such an example, the BIOS may execute instructions that control the configurations of the MUX 122 (e.g., via logic values).

The first, second, third, and fourth channels 108, 110, 126, 128 may be implemented as any type of trace, wire, link, and/or any other type of path or connection for electrically coupling two components. Additionally, while in the illustrated example the first, second, third, and fourth channels 108, 110, 126, 128 appear as single channels, the first, second, third, and/or fourth channels 108, 110, 126, 128 may each include more than one wire. For example, a USB Type A connector/port implementing USB 2.0 protocol uses two data wires and a USB Type A connector/port implementing USB 3.0 protocol (e.g., Gen 1 or Gen 2) has four additional data wires (six data wires in total). In such an example, the first, second, third, and/or fourth channels 108, 110, 126, 128 may each include six wires such that the first, second, third, and/or fourth channels 108, 110, 126, 128 can support USB 2.0 and USB 3.0 protocols. Also, while the first and second inputs In1, In2 and the first and second outputs Out1, Out2 are depicted as single ports or pins, the first and second inputs In1, In2 and the first and second outputs Out1, Out2 may each include multiple pins. For example, with a six wire USB channel, the first and second inputs In1, In2 may each include six pins and the first and second outputs Out1, Out2 may similarly each include six pins. In such an example, the MUX 122 electrically couples the six wires of the first channel 108 to the corresponding six wires of the third or fourth channels 126, 128, and same for the second channel 110. Also, while in the illustrated example the MUX 122 is depicted as separate from the motherboard 101, the MUX 122 may be integrated into the motherboard 101 and/or the I/O chipset 102. In other examples, the MUX 122 may be implemented as a separate hardware and/or software device that is electrically coupled to the motherboard 101 and/or the I/O chipset 102.

In other examples, the example MUX 122 may include more than two inputs and/or outputs. For example, if the motherboard 101 and/or the I/O chipset has three channels (e.g., two low-speed channels and one high-speed channel), the MUX 122 may have three inputs and three outputs. In such an example, the three outputs may be electrically coupled via channels to respective ports. The MUX 122 may operate between three different configurations that connect different ones of the inputs to the outputs, such that any of the three ports may be used as the high-speed channel while the other two ports are used as low-speed channels. In such an example, the line selector 124 may provide three different signals corresponding to the three different configurations. Also, in other examples, the computing system 100 may include more ports than outputs on the MUX 122 using a series of multiplexers. For example, an input of a second multiplexer may be electrically coupled to the second output Out2. The second multiplexer may have three outputs, each connected to a different port. The second multiplexer may selectively couple one of the three outputs to the input and, thus, to the second output Out2 of the MUX 122. Thus, four ports may be implemented in the example computing system 100.

Figure 2:
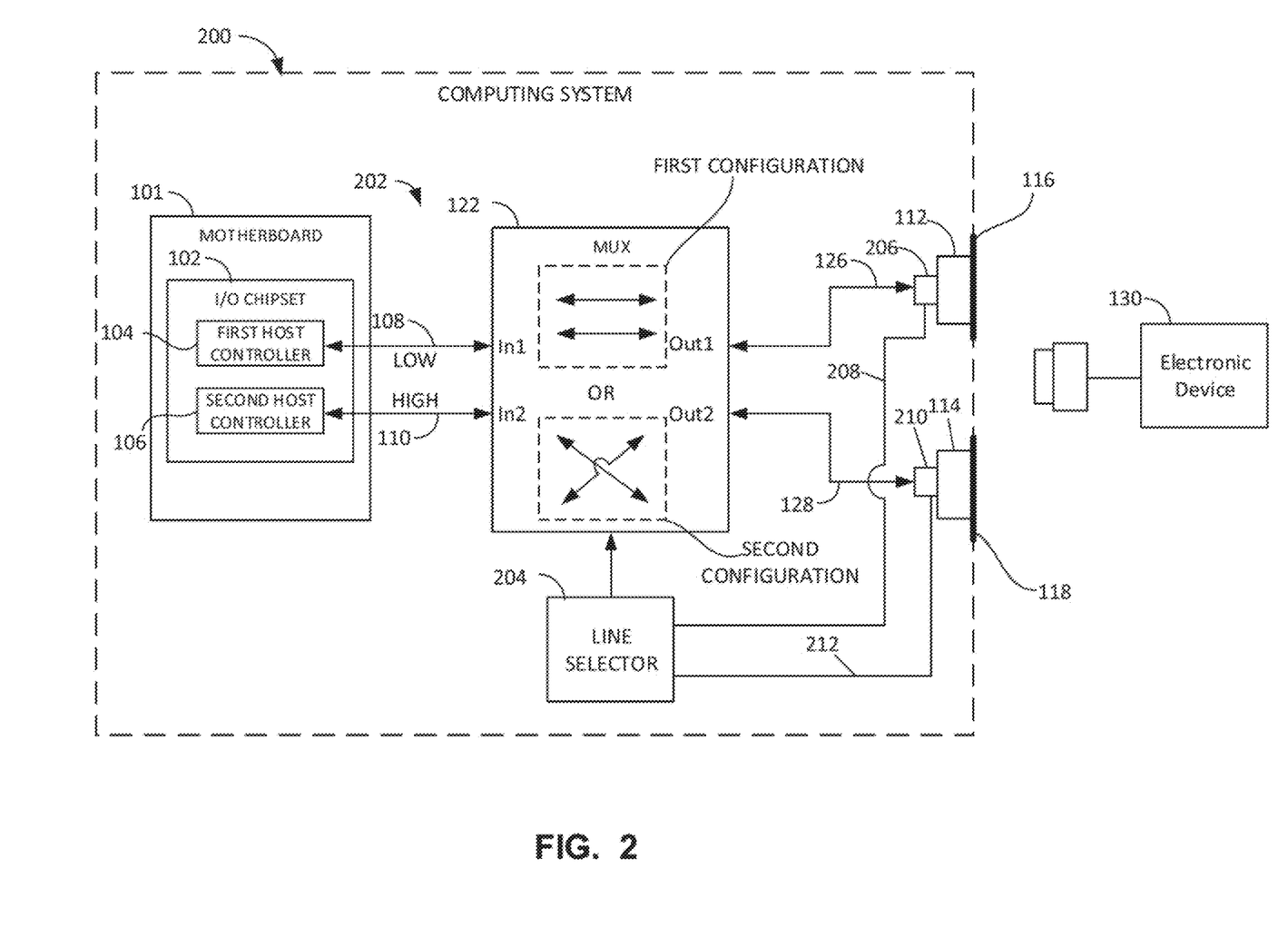
FIG. 2 illustrates another example computing system having another example multiplexer system with an example line selector constructed in accordance with the teachings of this disclosure.

FIG. 2 illustrates another example computing system 200 having another example multiplexer system 202 constructed in accordance with the teachings of this disclosure. In the illustrated example, the computing system 200 includes the motherboard 101, the I/O chipset 102, the first and second host controllers 104, 106, the first, second, third, and fourth channels 108, 110, 126, 128, the first and second ports 112, 114, the first and second panels 116, 118, the MUX 122, and the example electronic device 130, which are disclosed in connection with FIG. 1. To avoid redundancy, a description of the motherboard 101, the I/O chipset 102, the first, second, third, and fourth channels 108, 110, 126, 128, the first and second ports 112, 114, the first and second panels 116, 118, the MUX 122, and the example electronic device 130 are not repeated. Instead, the interested reader is referred back to the discussion of FIG. 1. To facilitate this process, the same references numerals are used in FIGS. 1 and 2 to refer to like parts.

The example multiplexer system 202 of FIG. 2 includes the MUX 122 and an example line selector 204 that configures the MUX 122. In some examples, the line selector 204 configures the MUX 122 on a first-come first-serve basis depending on the type of electronic device plugged into one of the first or second ports 112, 114. For example, assume the electronic device 130 is a high-speed device capable of transferring data in accordance with the same protocol as the second host controller 106. If the electronic device 130 is plugged into the first port 112 and no other electronic device is currently connected to the second channel 110 (the high-speed channel), the line selector 204 configures (e.g., via a logic signal) the MUX 122 to operate in the second configuration such that the electronic device 130 is connected to the second channel 110 (the high-speed channel). If a second electronic device is connected to the second port 114, the second device 114 is connected to the first channel 108 (the low-speed channel). The line selector 204 may be implemented as hardware (e.g., a logic circuit) and/or software tool (e.g., in the BIOS of the computing system 200, in a first Power Delivery (PD) controller 206, etc.).

In some examples, the type of the electronic device 130 and/or information about the data transfer capabilities of the electronic device 130 may be determined using a Power Delivery (PD) controller. For example, as illustrated in FIG. 2, a first PD controller 206 may be associated with the first port 112 (e.g., coupled between the first port 112 and the third channel 126). The first PD controller 206 may be used to regulate power supplied to the first port 112 (e.g., for charging). As such, the first PD controller 206 detects the electronic device 130 and determines certain information about the electronic device 130 to control the appropriate power, such as the type (e.g., phone, printer, monitor, etc.) of the electronic device 130 plugged into the first port 112, a data transfer protocol associated with a host controller connected to the other side of the first port 112, a data transfer protocol used by the electronic device 130 plugged into the first port 112, etc. In the illustrated example, the first PD controller 206 is communicatively coupled to the line selector 204 via a first PD controller line 208. The first PD controller 206 may communicate information to the line selector 204 about the type of the electronic device 130 connected to the first port 112. Based on the type of device and/or data transfer protocol used by the electronic device 130, the line selector 204 selectively configures (e.g., using a first or second logic signal/value) the MUX 122. In the illustrated example, a second PD controller 210, similar to the first PD controller 206, is associated with the second port 114 and is communicatively coupled to the line selector 204 via a second PD controller line 212. Thus, the line selector 204 may receive information about the type of device plugged into the first or second ports 112, 114 and determines how to configure the MUX 122, In other examples, the line selector 204 may determine the type of device plugged into the first or second ports 112, 114 in other manners, such as via user input, via the BIOS of the computing system 200, via an embedded controller (EC), and/or the device 130 using a different communication channel.

Additionally or alternatively, the line selector 204 may be programmed to configure the MUX 122 based on a rule or parameter (or multiple rules or parameters) established by a user. For example, a user may establish a priority level for certain types of electronic devices over other types of electronic devices. For example, a user may establish (e.g., via a computer application) that a first type of device, such as a high-definition monitor, has a higher priority to the second channel 110 than a second type of device, such as a printer. If the first type of device and the second type of device are plugged in to the first and second ports 112, 114 at the same time or about the same time (e.g., before one of the first type of device or the second type of device is connected to one of the first or second host controllers 104, 106), the line selector 204 can configure the MUX 122 to connect the first type of device to the second channel 110 (the high-speed channel) and connect the second type of device to the first channel 108 (the low-speed channel).

Figure 3:
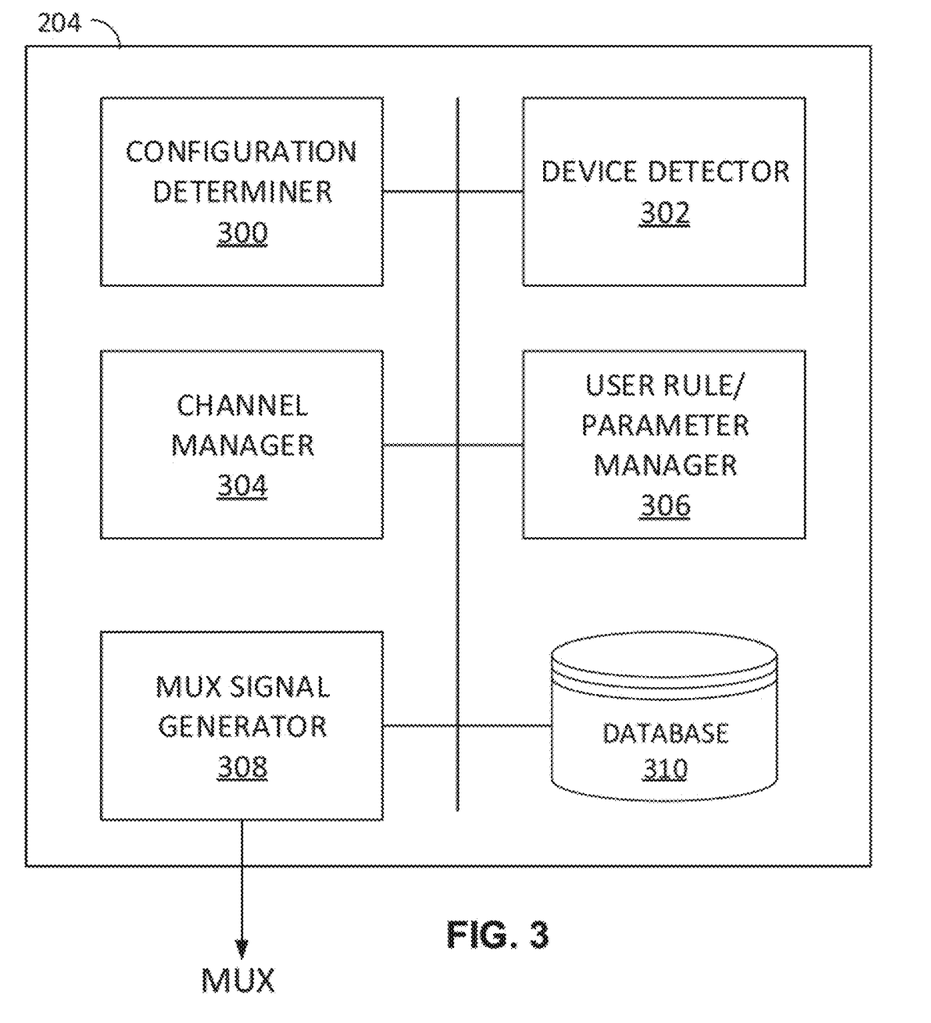
FIG. 3 is a block diagram of the example line selector of FIG. 2.

FIG. 3 is a block diagram of the example line selector 204. In the illustrated example, the line selector 204 includes a configuration determiner 300, a device detector 302, a channel manager 304, a user rule/parameter manager 306, a MUX signal generator 308, and a database 310. The device detector 302 detects and/or otherwise determines the type of device and/or data transfer protocol used by an electronic device plugged into the first and second ports 112, 114. In some examples, the device detector 302 determines the type of device and/or data transfer protocol based on signals and/or information received from the first and second PD controllers 206, 210 (FIG. 2). The channel manager 304 determines which channels are open and which channels are currently being used. In some examples, the channel manager 304 determines whether certain channels are open or being used based on information from a PD controller, such as the first and second PD controllers 206, 210. Additionally or alternatively, a record of the connections may be stored in the database 310, for example, and the channel manager 304 may check whether a previous connection to a specific channel has already been established. The user/rule parameter manger 306 stores and/or manages any rules or parameters set up by a user that may override the first-come first-serve logic. The configuration determiner 300 determines how to configure the MUX 122 based on the type of device plugged into the port(s), the channels that are open (and, if applicable, any rules established by a user). In some examples, the various configurations may be stored in the database 310, for example. The MUX signal generator 308 generates a signal (e.g., a logic value or control signal) that configures the MUX 122 based on selected configuration as determined by the configuration determiner 300.

While an example manner of implementing the example line selector 204 of FIG. 2 is illustrated in FIG. 3, any of the elements, processes, and/or devices illustrated in FIG. 3 may be combined, divided, re-arranged, omitted, eliminated, and/or implemented in any other way. Further, the example configuration determiner 300, the example device detector 302, the example channel manager 304, the example user rule/parameter manager 306, the example MUX signal generator 308, and/or, more generally, the example line selector 204 of FIG. 3 may be implemented by hardware, software, firmware, and/or any combination of hardware, software, and/or firmware. Thus, for example, any of the example configuration determiner 300, the example device detector 302, the example channel manager 304, the example user/rule parameter manager 306, the example MUX signal generator 308, and/or, more generally, the example line selector 204 could be implemented by an analog or digital circuit, a logic circuit, a programmable processor, an application specific integrated circuit (ASIC), a programmable logic device (PLD), and/or a field programmable logic device (FPLD). When reading any of the apparatus or system claims of this patent to cover a purely software and/or firmware implementation, at least one of the example configuration determiner 300, the example device detector 302, the example channel manager 304, the example user/rule parameter manager 306, and/or the example MUX signal generator 308 is/are hereby expressly defined to include a non-transitory computer readable storage device or storage disk such as a memory, a digital versatile disk (DVD), a compact disk (CD), a Blu-ray disk, etc. including the software and/or firmware. Further still, the example line selector 204 of FIG. 3 may include other elements, processes, and/or devices in addition to, or instead of, those illustrated in FIG. 3, and/or may include more than one of any or all of the illustrated elements, processes and devices.

Figure 4:
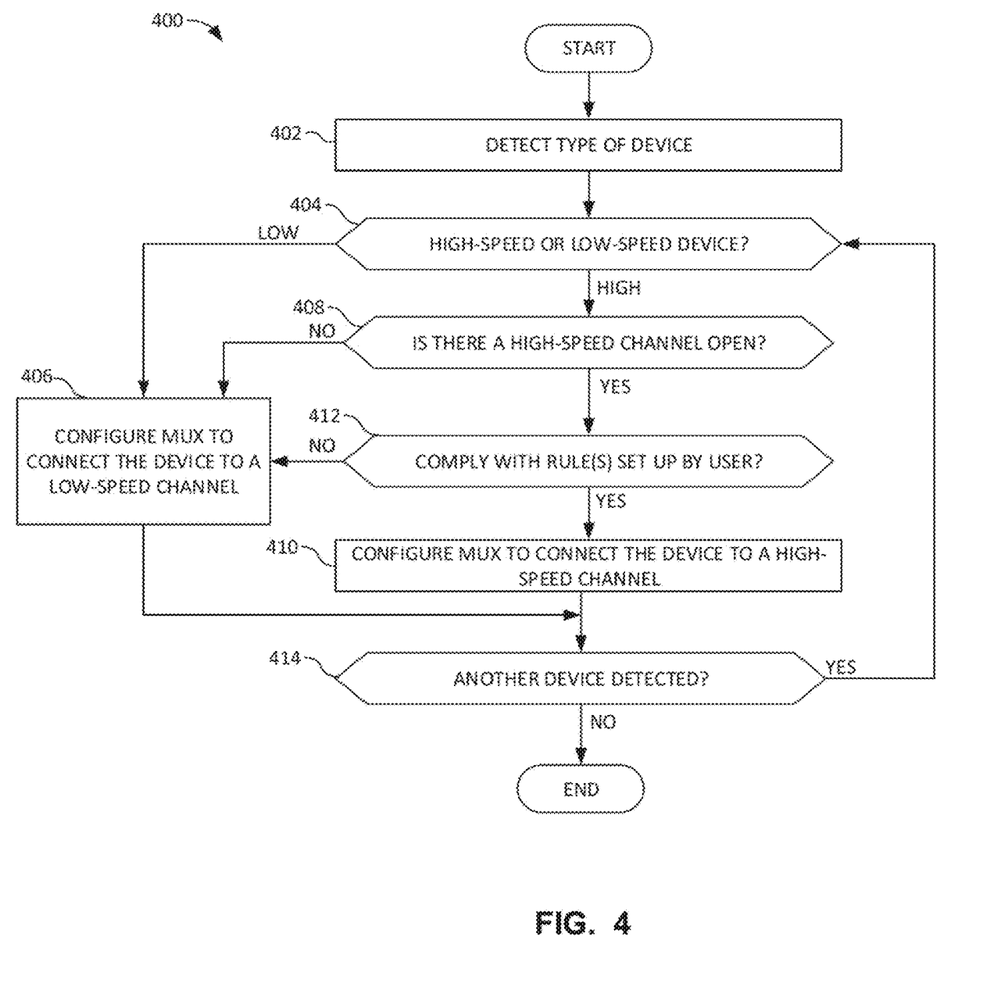
FIG. 4 is a flowchart representative of example machine readable instructions that may be executed to implement the example line selector of FIG. 3.

A flowchart representative of example machine readable instructions for implementing the example line selector 204 of FIG. 3 is shown in FIG. 4. In this example, the machine readable instructions comprise a program for execution by a processor such as the processor 512 shown in the example processor platform 500 discussed below in connection with FIG. 5. The program may be embodied in software stored on a non-transitory computer readable storage medium such as a CD-ROM, a floppy disk, a hard drive, a digital versatile disk (DVD), a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowchart illustrated in FIG. 4, many other methods of implementing the example line selector 204 may alternatively be used. For example, the order of execution of the blocks may be changed, and/or some of the blocks described may be changed, eliminated, or combined. Additionally or alternatively, any or all of the blocks may be implemented by a hardware circuit (e.g., a discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example process of FIG. 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

FIG. 4 is flowchart 400 representative of example machine readable instructions that may be executed to implement the example line selector 204 of FIG. 3. The example process of FIG. 4 is described in connection with the example computing system 200 of FIG. 2 and the example line selector 204 of FIG. 3. At block 402, the example device detector 302 detects or determines a type of the electronic device 130 connected to (e.g., plugged into) the first or second port 112, 114. In some examples, the device detector 302 determines the type of the electronic device 130 based on information from a PD controller, such as the first and second PD controllers 206, 210 of FIG. 2. At block 404, the device detector 302 determines whether the electronic device 130 is a device (e.g., a high-speed device) having the same high-speed capability as the second host controller 106 or a device (e.g., a low-speed device) having the same low-speed capability as the first host controller 104. In other words, the device detector 302 determines which data transfer protocol is implemented by the electronic device 130 and which channels are capable of being used with the data transfer protocol of the electronic device 130.

If the electronic device 130 is determined to be a low-speed device (e.g., a device not capable of implementing the high-speed protocol of the second channel 110), the example configuration determiner 300 determines which MUX configuration connects the electronic device 130 to the first channel 108 (the low-speed channel) and the signal generator 308 outputs a logic signal (e.g., corresponding to a logic value of zero) to the MUX 122 that results in the first configuration, at block 406.

If the electronic device 130 is determined to be a high-speed device (at block 404) (e.g., a device capable of implementing the high-speed protocol of the second channel 110), the channel manager 304 determines if the second channel 110 (the high-speed channel) is open at block 408. In some examples, the channel manager 304 determines whether the first or second channels 108, 110 are open based on signals from the respective first and second PD controllers 206, 210. Additionally or alternatively, records of the connections may be stored in the database 310, for example, and the channel manager 304 may check whether a previous connection to a specific channel has already been established. If the second channel 110 (the high-speed channel) is not open, control returns to block 406 where electronic device 130 is connected to the first channel 108 (the low-speed channel). If the second channel 110 (the high-speed channel) is open, the example configuration determiner 300 determines which MUX configuration connects the electronic device 130 to the second channel 110 (the high-speed channel) and the signal generator 308 outputs a logic signal to the MUX 122 that results in the second configuration, at block 410.

In some examples, prior to connecting the electronic device 130 to the second channel 110 (the high-speed channel), the user rule/parameter manager 306 determines whether there are any rules set up by a user that change the first-come first-serve logic at block 412. For example, the user may have established that certain devices, such as printers, although capable of higher speeds, should be connected to the lower speed channel(s) to ensure access to the higher speed channel is available for another type of device, such as a display monitor. In such an instance, if a user rule/parameter is established, control returns to block 406 where electronic device 130 is connected to the first channel 108 (the low-speed channel). As another example, the user may have established that a first type of device, such as a display monitor, has a priority over a second type of device, such as a printer. If a display monitor and a printer are plugged into the first and second ports 112, 114 at or about the same time, the user rule parameter manager 306 determines that the display monitor should be connected to the second channel 110 (the high-speed channel) over the printer. If there are no user rules established or the connection of the electronic device 130 to the second channel 110 (the high-speed channel) complies with the user rules, the example configuration determiner 300 determines which MUX configuration connects the electronic device 130 to the second channel 110 (the high-speed channel) and the signal generator 308 outputs a logic signal to the MUX 122 that results in the second configuration, at block 410. In some examples, the channel manager 304 saves a record of the connection in the database 310.

After the electronic device 130 is connected to either the first channel 108 (the low-speed channel) or the second channel 110 (the high-speed channel), the device detector 302 determines if there is another device connected to the computing system 200, either to the first port 112 or the second port 114, at block 414. If another device is detected, control returns to block 404. The example process of FIG. 4 may be repeated each time a new device is added. The example line selector 204 connects electronic devices to the high-speed/low-speed channels on a first-come first-serve basis unless there are any overriding rules established by a user. Otherwise, if no device is detected (e.g., the computer is turned off), the example process of FIG. 4 ends.

Figure 5:
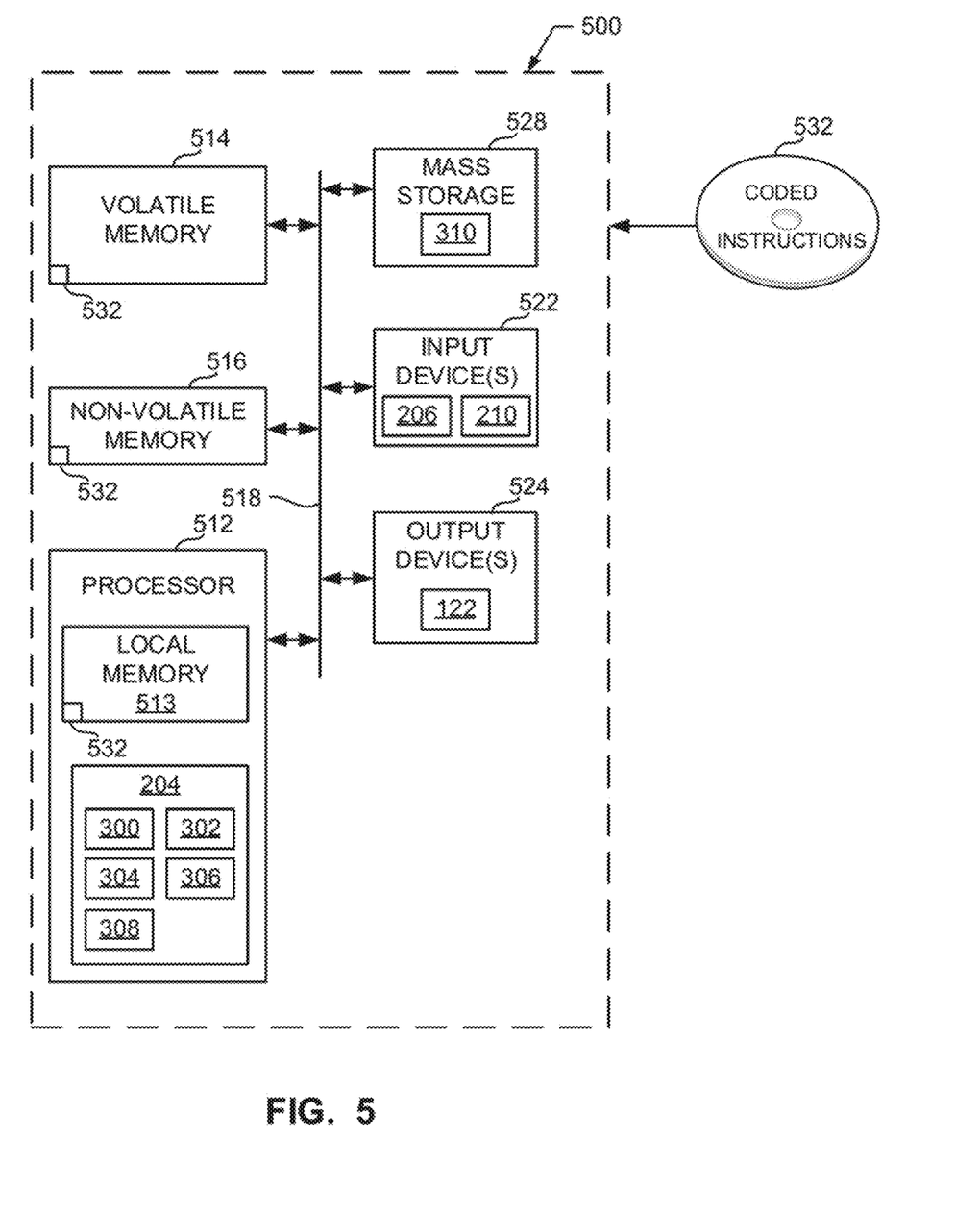
FIG. 5 is a processor platform that may execute the example instructions of FIG. 4 to implement the example line selector of FIG. 4.

FIG. 5 is a block diagram of an example processor platform 500 capable of executing the instructions of FIG. 4 to implement the example line selector 204 of FIG. 3. The processor platform 500 can be, for example, an embedded device, a server, a personal computer (e.g., the computing system 100, the computing system 200), a mobile device (e.g., a cell phone, a smart phone, a tablet such as an iPad™), a personal digital assistant (PDA), an Internet appliance, a DVD player, a CD player, a digital video recorder, a B-ray player, or any other type of computing device.

The processor platform 500 of the illustrated example includes a processor 512. The processor 512 of the illustrated example is hardware. For example, the processor 512 can be implemented by an integrated circuit, a logic circuit, a microprocessor, or a controller from any desired family or manufacturer. The hardware processor may be a semiconductor based (e.g., silicon based) device. The processor 512 may be a central processing unit (CPU) (e.g., on the motherboard 101) or another processor or microcontroller of the computing system 200, for instance. In this example, the processor 512 implements the example configuration determiner 300, the example device detector 302, the example channel manager 304, the example user rule/parameter manager 306, the example MUX signal generator 308, and/or, more generally, the example line selector 204.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a memory controller.

In the illustrated example, input devices 522, such as the first and/or second PD controllers 206, 210 are connected to the bus 518. Also, an output device 524, such as the MUX 122, is connected to the bus 518. In other examples, other input device(s) (e.g., a keyboard, an audio sensor, a camera, a mouse, etc.) and/or output device(s) (e.g., a display device, a touchscreen, a printer, a speaker, etc.) may be connected to the bus 518.

The processor platform 500 of the illustrated example also includes a mass storage device 528 for storing software and/or data. Examples of the mass storage device 528 may include a floppy disk drive, a hard drive disk, a compact disk drive, a Blu-ray disk drive, a RAID system, and a digital versatile disk (DVD) drive. In this example, the mass storage device 528 may include, for example, the database 310.

Coded instructions 532 of FIG. 4 may be stored in the mass storage device 528, in the volatile memory 514, in the non-volatile memory 516, and/or on a removable tangible computer readable storage medium such as a CD or DVD.

From the foregoing, it will be appreciated that example methods, apparatus, systems, and articles of manufacture have been disclosed that can switch channels on a chipset of a computing system to different endpoint port locations. As such, users are not restricted by the location of the endpoint port locations as seen in current computing system architectures. Instead, examples disclosed herein can be used to change the I/O port configurations. Thus, example methods, apparatus, systems, and articles of manufacture enable an end user to select the ideal location for connecting an electronic device. Example line selectors disclosed herein may automatically detect and configure the connections based on a first-come first-serve basis, thereby providing a user-friendly computing system. Further, unlike hubs that introduce latency and require knowledge of the base protocol, the examples disclosed herein can provide full bandwidth and operate independent of the base protocol. Thus, examples disclosed herein provide a simpler, more flexible and less expensive solution.

Although certain example methods, apparatus, systems, and articles of manufacture have been disclosed herein, the scope of coverage of this patent is not limited thereto. On the contrary, this patent covers all methods, apparatus, systems, and articles of manufacture fairly falling within the scope of the claims of this patent.

What is claimed is:

1. A computing system comprising:
    a multiplexer having a first input, a second input, a first output, and a second output;
    a first channel connecting the first input to a first host controller, the first host controller to transfer data at a first speed;
    a second channel connecting the second input to a second host controller, the second host controller to transfer data at a second speed higher than the first speed;
    a third channel connecting the first output to a first port, the first port to receive a connector of an electronic device;
    a fourth channel connecting the second output to a second port; and
    a line selector to, based on a type of the electronic device connected to the first port, configure the multiplexer between (A) a first configuration in which the first input is electrically coupled to the first output and the second input is electrically coupled to the second output, and (B) a second configuration in which the first input is electrically coupled to the second output and the second input is electrically coupled to the first output.

2. The computing system of claim 1, further including a Power Delivery (PD) controller associated with the first port, the line selector to determine the type of the electronic device connected to the first port based on a signal from the PD controller.

3. The computing system of claim 1, wherein the first port is one of a USB Type A port, a USB Type B port, a USB Type C port, a DisplayPort port, or a Thunderbolt port.

4. The computing system of claim 1, wherein the second port is a same type of port as the first port.

5. The computing system of claim 1, wherein the first port is coupled to a first panel located on a first side of a chassis of the computing system, and the second port is coupled to a second panel located on a second side of the chassis of the computing system different than the first side.

6. A computing system comprising:
    a first input/output (I/O) port to receive a connector of an electronic device;
    a second I/O port;
    a chipset with a first host controller capable of transferring data at a first speed and a second host controller capable of transferring data at a second speed faster than the first speed; and
    a multiplexer system to selectively connect the first I/O port to the first host controller or the second host controller, the multiplexer system including a multiplexer and a line selector to switch the multiplexer between (A) a first configuration in which the first I/O port is connected to the first host controller and the second I/O port is connected to the second host controller, and (B) a second configuration in which the first I/O port is connected to the second host controller and the second I/O port is connected to the first host controller.

7. The computing system of claim 6, wherein the line selector includes a jumper switch to enable a user to manually select the first or second configuration for the multiplexer.

8. The computing system of claim 6, wherein the line selector is to configure the multiplexer based on a type of the electronic device connected to the first I/O port.

9. The computing system of claim 8, further including a Power Delivery (PD) controller associated with the first I/O port, the PD controller to determine the type of the electronic device connected to the first I/O port.

10. A non-transitory machine readable storage medium comprising instructions that, when executed, cause at least one machine to at least:
   determine a type of a device connected to a first input/output (I/O) port on a computing system, the computing system including a second I/O port, the computing system including a multiplexer disposed between the first I/O port and a chipset having a first host controller and a second host controller, the second host controller to communicate at a higher speed than the first host controller; and
   selectively configure the multiplexer to connect the first I/O port to the first host controller or the second host controller based on the type of the device, by configuring the multiplexer to (A) connect the first I/O port to the first host controller and connect the second I/O port to the second host controller, or (B) connect the first I/O port to the second host controller and connect the second I/O port to the first host controller.

11. The non-transitory machine readable storage medium of claim 10, wherein the instructions, when executed, cause the machine to configure the multiplexer to connect the first I/O port to the first host controller when the type of the device is a lower speed device and configure the multiplexer to connect the first I/O port to the second host controller when the type of the device is a higher speed device.

12. The non-transitory machine readable storage medium of claim 10, wherein the instructions, when executed, cause the machine to determine if the second host controller is connected to another device and, if so, configure the multiplexer to connect the first I/O port to the first host controller.

13. The non-transitory machine readable storage medium of claim 10, wherein the instructions, when executed, cause the machine to configure the multiplexer based on a priority level of the device.

14. The computing system of claim 1, wherein the first and second host are part of a same chipset.

15. The computing system of claim 14, wherein the chipset is integrated into or part of a motherboard.

* * * * *